No. 713,752. Patented Nov. 18, 1902.
L. D. CRANDALL.
VEHICLE HUB AND SPINDLE.
(Application filed Apr. 8, 1902.)
(No Model.)

Witnesses:

Inventor
Lucian D. Crandall
By Henry N. Copp
his Atty.

THE NORRIS PETERS CO., PHOTO-LITHO., WASHINGTON, D. C.

UNITED STATES PATENT OFFICE.

LUCIAN D. CRANDALL, OF SPRINGVILLE, UTAH.

VEHICLE HUB AND SPINDLE.

SPECIFICATION forming part of Letters Patent No. 713,752, dated November 18, 1902.

Application filed April 8, 1902. Serial No. 101,875. (No model.)

*To all whom it may concern:*

Be it known that I, LUCIAN D. CRANDALL, a citizen of the United States, residing at Springville, county of Utah, and State of Utah, have invented certain new and useful Improvements in Vehicle Hubs and Spindles, of which the following is a specification.

My invention relates to vehicle hubs and spindles.

The object of the present invention is the provision of an improved and novel axle or spindle box for vehicle-hubs and an improved spindle which will provide for adjustment for wear, minimize wear and friction of the parts, exclude dust, and lubricate or oil the parts.

Having the foregoing object in view, the invention consists of certain improved features and novel combinations, arrangements, and adaptations of parts set forth in detail hereinafter.

Figure 1:
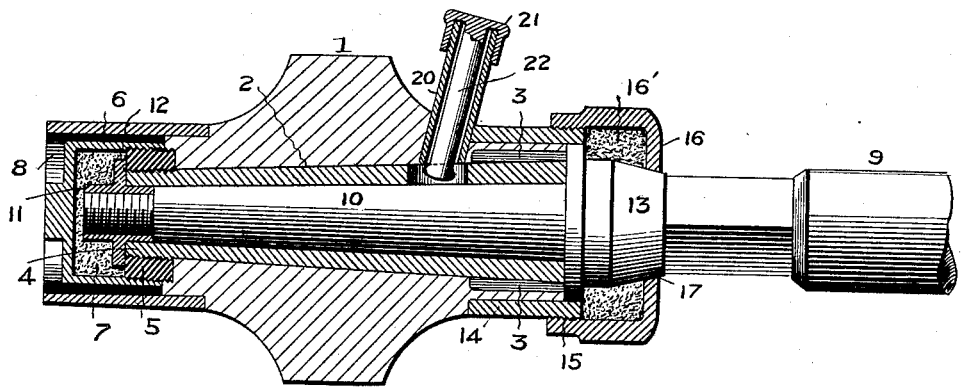
Figure 2:
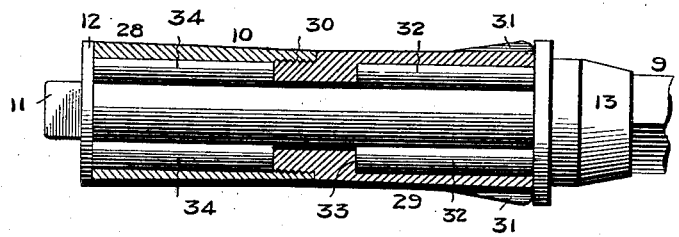
Figure 3:
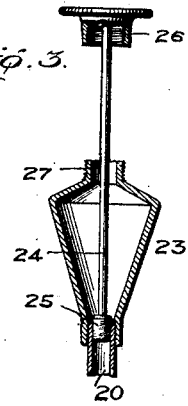

In the accompanying drawings, Figure 1 is a longitudinal section; Fig. 2, a longitudinal section with certain parts in full lines, showing the use of roller-bearings; Fig. 3, a sectional view of a modified form of lubricant-feeder, and Fig. 4 a sectional detail showing a modified connection for securing the cap to the sand-band.

The numeral 1 designates the hub, and 2 is the boxing, which is provided with ears or flanges 3, engaging with the hub to prevent the boxing from turning therein. The boxing has a tapered diameter and is screw-threaded at one end 4, over which screws an externally-screw-threaded collar or sleeve 5, over which screws the dust-cap 6, which is preferably filled with cotton or waste 7, while 8 is a shell secured on the hub and inclosing the cap.

The numeral 9 designates the axle, which has the tapered spindle 10, and 11 is a nut or bur screwed onto the end of the spindle and provided with a flange 12, adapted to abut the collar 5 and hold the hub on the spindle.

The numeral 13 is a cone held on the square portion of the axle and abutting the inner end of the hub. On the inner end of the hub is a sand-band 14, provided with screw-threads 15.

Figure 4:
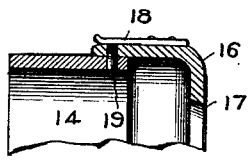

The numeral 16 designates a cap adapted to screw on the threads 15, and the cone has a bearing on this cap at 17. The cap is filled with waste or cotton 16'. As shown in Fig. 4, in place of the screw-threaded connection between the sand-band 14 and the cap 16 the spring-catch 18 can be employed, preferably two or three of these catches being used, and they are provided with the pins 19, adapted to project through openings in the cap 16 and sand-band 14.

The oiling device consists of a tube 20 in the hub, which feeds the lubricant through an elongated opening in the boxing and the cap 21, having the plunger 22, which fits said tube 20. This plunger holds the lubricant down on the spindle after a suitable quantity has been introduced and prevents the lubricant from moving about or chucking up into the tube and insures the proper feeding to the spindle.

As shown in Fig. 3, I sometimes prefer to employ a lubricant-reservoir 23, which screws onto the tube 20. In this construction a plunger-rod 24 is employed, having a swab 25 and a threaded cap 26. The cap 26 is intended to be screwed onto the neck 27 of the reservoir, which holds the swab down in the tube 20. The swab is first introduced into the tube, the lubricant introduced into the reservoir, and the swab then pushed down into the tube to the spindle and the cap 26 screwed onto the part 27. To supply lubricant to the spindle, the cap 26 is unscrewed and the swab lifted out of the tube and the tube allowed to fill with lubricant, after which the swab is reintroduced into the tube and the cap screwed down. The reservoir can be secured to the spokes of the wheels by a suitable clasp and will provide a means for keeping the spindle properly lubricated at all times.

I have adapted roller-bearings to the invention, as shown in Fig. 2. There the boxing is made in two parts, 28 and 29, screw-threaded together at 30, and the section of boxing 29 is provided with flanges 31, which engage the hub to hold the section securely after it has been put in the hub by pressure. The numerals 32 designate the rollers in the boxing-section 29, which are held against longitudinal displacement by the collar of the cone and by the shoulder 33 on the boxing, while the rollers 34, located in the boxing-section 28, are held against longitudinal displacement by the nut or cap on the end of the spindle and inner end of the boxing-spindle 29.

It will be seen that dust or foreign material cannot gain access to the spindle to clog the same, and when the boxing is worn out at its ends from continued use the cone can be removed and reduced in size to permit the nut 11 to be screwed up farther to compensate for the wear.

I am aware that many changes of construction could be resorted to in carrying out my invention, and I do not, therefore, limit myself to the precise construction herein shown and described, but consider that I am entitled to all such variations as fall within the spirit and scope of the invention.

Having thus described my invention, what I claim as new, and desire to secure by Letters Patent, is—

1. In a device of the class described, the combination with a hub and a boxing therefor, of a spindle passing through the boxing, means for preventing displacement of the hub and boxing from the spindle, a cone on the spindle, and a cap on the hub which bears against the cone.

2. In a device of the class described, the combination with a hub and a boxing therefor, of a spindle passing through the boxing, means for preventing displacement of the hub and boxing from the spindle, a cone on the spindle which has a flange or collar bearing against the boxing, and a cap on the hub which bears against the cone.

3. In a device of the class described, the combination with a hub and a boxing having a screw-threaded end, of a collar threaded onto said screw-threaded end of the boxing, a spindle, a nut threaded onto the end of the spindle and bearing against the end of the boxing and collar aforesaid, and a member on the spindle adapted to bear against the other end of the boxing.

4. In a device of the class described, the combination with a hub and a boxing having a screw-threaded end, of a cap threaded onto said screw-threaded end, a spindle extending through the boxing, a nut or cap threaded onto the end of the spindle and adapted to bear against the end of the boxing and located within the cap aforesaid, a cone on the spindle having a flange adapted to bear against the opposite end of the boxing, and a cap engaged with the hub and having a bearing on the cone.

In testimony whereof I hereunto affix my signature in presence of two witnesses.

LUCIAN D. CRANDALL.

Witnesses:
JOHN S. BOYER,
JULIA A. BOYER.